United States Patent
Morita

(10) Patent No.: US 9,705,319 B2
(45) Date of Patent: Jul. 11, 2017

(54) POWER SUPPLY SYSTEM PROVIDING FAULT DETECTION USING SWITCHING ARRANGEMENT

(71) Applicant: DENSO CORPORATION, Kariya, Aichi-pref. (JP)

(72) Inventor: Tetsuo Morita, Nagoya (JP)

(73) Assignee: DENSO CORPORATION, Kariya (JP)

( * ) Notice: Subject to any disclaimer, the term of this patent is extended or adjusted under 35 U.S.C. 154(b) by 170 days.

(21) Appl. No.: 13/774,221

(22) Filed: Feb. 22, 2013

(65) Prior Publication Data

US 2013/0234504 A1 Sep. 12, 2013

(30) Foreign Application Priority Data

Mar. 12, 2012 (JP) ................ 2012-054582

(51) Int. Cl.
*B60R 16/03* (2006.01)
*H02J 1/00* (2006.01)
(Continued)

(52) U.S. Cl.
CPC ........... *H02J 1/00* (2013.01); *B60R 16/03* (2013.01); *H01M 10/425* (2013.01);
(Continued)

(58) Field of Classification Search
CPC .................................................. B60R 16/03
(Continued)

(56) References Cited

U.S. PATENT DOCUMENTS 3,657,720 A * 4/1972 Avdenko ............... B60K 28/10
290/37 A
5,525,891 A * 6/1996 Meyer et al. ............... 320/128
(Continued)

FOREIGN PATENT DOCUMENTS

CN 102150359 A 8/2011
JP A-2007-46508 2/2007
(Continued)

OTHER PUBLICATIONS

Notification of the First Office Action dated Sep. 10, 2014 from Chinese Patent Application No. 201310074942.X (with English-language translation).

*Primary Examiner* — Adi Amrany
(74) *Attorney, Agent, or Firm* — Oliff PLC

(57) ABSTRACT

A power supply system includes a first-battery, a battery unit including a second-battery, and a generator. The battery unit is connected to the generator and the first-battery via a conductor. The battery unit includes a connection-terminal connected to the conductor, an output-terminal connected to a load, a first-switch disposed on a wiring connecting the connection-terminal and the output-terminal, a branch line branching off from the wiring between the first-switch and the output-terminal and connected to the second-battery, a second-switch disposed on the branch line between the wiring and the second-battery, a first-voltage-detecting unit detecting voltage of the connection-terminal, and a switch control unit controlling the first and second-switches. The power supply system further includes a second-voltage-detecting unit detecting electromotive force of the first-battery, and a fault-determining unit determining a fault of the conductor based on opening/closing states of the first and second-switches and results of the first and second-voltage-detecting units.

10 Claims, 3 Drawing Sheets

(51) Int. Cl.
  *H01M 10/42* (2006.01)
  *H01M 10/48* (2006.01)
  *H02J 1/06* (2006.01)
  *H02J 7/14* (2006.01)
  *H01M 10/052* (2010.01)

(52) U.S. Cl.
  CPC ............... *H01M 10/48* (2013.01); *H02J 1/06* (2013.01); *H01M 10/052* (2013.01); *H01M 2220/20* (2013.01); *H02J 7/1423* (2013.01); *Y02E 60/122* (2013.01); *Y10T 307/696* (2015.04)

(58) Field of Classification Search
  USPC ........................................................... 307/9.1
  See application file for complete search history.

(56) References Cited

U.S. PATENT DOCUMENTS

| | | | | |
|---|---|---|---|---|
| 5,751,073 | A | * | 5/1998 | Ross ...................... B60R 25/24 123/179.2 |
| 6,232,674 | B1 | | 5/2001 | Frey et al. |
| 6,275,001 | B1 | * | 8/2001 | Dierker ......................... 320/103 |
| 6,359,547 | B1 | * | 3/2002 | Denison ............... B60R 25/102 340/5.73 |
| 7,336,002 | B2 | * | 2/2008 | Kato et al. .................. 307/10.6 |
| 7,800,244 | B2 | * | 9/2010 | Treguer ....................... 307/10.1 |
| 8,069,831 | B2 | * | 12/2011 | Matsubara ........... B60R 25/045 123/179.2 |
| 2002/0158513 | A1 | * | 10/2002 | Amano et al. ............... 307/10.6 |
| 2003/0036415 | A1 | * | 2/2003 | Shimodaira .......... H04B 1/1607 455/572 |
| 2004/0004397 | A1 | * | 1/2004 | Nagae ............... B60R 25/02156 307/10.3 |
| 2005/0033503 | A1 | * | 2/2005 | Yamamoto .............. B60R 25/04 701/114 |
| 2008/0002322 | A1 | * | 1/2008 | Hirasawa .............. B60L 3/0046 361/79 |
| 2009/0108674 | A1 | * | 4/2009 | Ozaki et al. ................. 307/10.6 |
| 2009/0160249 | A1 | * | 6/2009 | Soma et al. ................... 307/9.1 |
| 2010/0078994 | A1 | * | 4/2010 | Kobayashi et al. ......... 307/10.6 |
| 2010/0244558 | A1 | * | 9/2010 | Mitsutani et al. ............. 307/9.1 |
| 2011/0001352 | A1 | | 1/2011 | Tamura et al. |
| 2011/0012424 | A1 | * | 1/2011 | Wortberg et al. ............ 307/10.1 |
| 2011/0210698 | A1 | * | 9/2011 | Sakai ..................... H02J 7/041 320/109 |
| 2011/0270490 | A1 | * | 11/2011 | Katou ....................... B60L 1/00 701/36 |
| 2013/0249282 | A1 | * | 9/2013 | Ishii et al. ................... 307/10.1 |

FOREIGN PATENT DOCUMENTS

| | | |
|---|---|---|
| JP | A-2008-189094 | 8/2008 |
| JP | A-2010-195336 | 9/2010 |
| JP | A-2011-4556 | 1/2011 |
| JP | A-2011-15516 | 1/2011 |
| JP | A-2011-176958 | 9/2011 |
| JP | A-2011-178384 | 9/2011 |
| JP | A-2011-234479 | 11/2011 |

\* cited by examiner

POWER SUPPLY SYSTEM PROVIDING FAULT DETECTION USING SWITCHING ARRANGEMENT

CROSS-REFERENCE TO RELATED APPLICATION

This application is based on and claims the benefit of priority from earlier Japanese Patent Application No. 2012-54582 filed Mar. 12, 2012, the description of which is incorporated herein by reference.

BACKGROUND

Technical Field

The present invention relates to a power supply system including a first storage battery, a second storage battery, and a generator charging the first storage battery and the second storage battery.

Related Art

A power supply system for a vehicle is proposed in which a relatively inexpensive lead storage battery is used as a first storage battery, and a lithium-ion storage battery, which has energy efficiency in discharge and charge and energy density higher than those of a lead storage battery, is used as a second storage battery. In the system, the storage batteries are connected to a generator in parallel. For example, in JP-A-2007-46508, while an engine is driven, electrical power is supplied to an electric load (auxiliary unit) from a lead storage battery and a generator, and the lead storage battery and a lithium-ion storage battery are charged by the generator. While the engine is stopped, electrical power is supplied to the electric load (auxiliary unit) from the lithium-ion storage battery.

As described above, in the power supply system including a lead storage battery (first storage battery) and a lithium-ion storage battery (second storage battery), a battery unit is structured in which the lithium-ion storage battery and a controller controlling electric capacity of the lithium-ion storage battery are unitized. The battery unit is connected to the lead storage battery and the generator via connecting conductors (external unit wirings) such as a wiring harness. In this case, there is a concern that a fault such as a disconnection fault or a ground fault could occur in the connecting conductors. If a disconnection fault or a ground fault occurs in the connecting conductors, the lithium-ion storage battery cannot be charged. Thereby, electrical power cannot be supplied from the lithium-ion storage battery to the electric load, which is unintentional.

In addition, a fault of the power supply system other than the faults occurring in the connecting conductors (external unit wirings) such as a wiring harness outside the battery unit is considered to in possibly occur inside the battery unit. In this case, even if a fault occurs inside the battery unit, the lithium-ion storage battery cannot be charged. Thereby, it is possible that electrical power cannot be supplied from the lithium-ion storage battery to the electric load, which is unintentional.

When any fault occurs in the power supply system, and if it is erroneously determined that the battery unit is faulty even though the fault has occurred in the connecting conductors, the battery unit is unnecessarily changed or subjected to maintenance.

SUMMARY

An embodiment provides a power supply system which properly determines a fault of a connecting conductor which connects a generator and a storage battery to a battery unit.

As an aspect of the embodiment, a power supply system includes: a first storage battery; a battery unit which includes a second storage battery; and a generator which charges the first storage battery and the second storage battery. The battery unit is connected to the generator and the first storage battery via a connecting conductor. The battery unit includes: a connection terminal to which the connecting conductor is connected; an output terminal which is connected to an electric load and supplies electrical power to the electric load from any of the generator, the first storage battery, and the second storage battery; a first switch which is disposed on a wiring connecting between the connection terminal and the output terminal, and opens and closes between the connection terminal and the output terminal; a branch line which branches off from the wiring between the first switch and the output terminal, and to which the second storage battery is connected; a second switch which is disposed on the branch line between the wiring and the second storage battery, and opens and closes between the wiring and the second storage battery; a first voltage detecting unit which detects voltage of the connection terminal; and a switch control unit which controls opening and closing of the first switch and the second switch. The power supply system further includes: a second voltage detecting unit which detects electromotive force of the first storage battery; and a fault determining unit which determines a fault of the connecting conductor on the basis of opening and closing states of the first switch and the second switch controlled by the switch control unit and detection results of the first voltage detecting unit and the second voltage detecting unit.

DETAILED DESCRIPTION OF THE PREFERRED EMBODIMENTS

With reference to the accompanying drawings, hereinafter is described an embodiment of the present invention.

A vehicle equipped with a power supply system of the present embodiment uses an internal combustion engine as a driving source. The vehicle has an idling stop function, which automatically stops the internal combustion engine if a predetermined automatic stop condition is met, and automatically restarts the internal combustion engine if a predetermined automatic restart condition is met.

Figure 1:
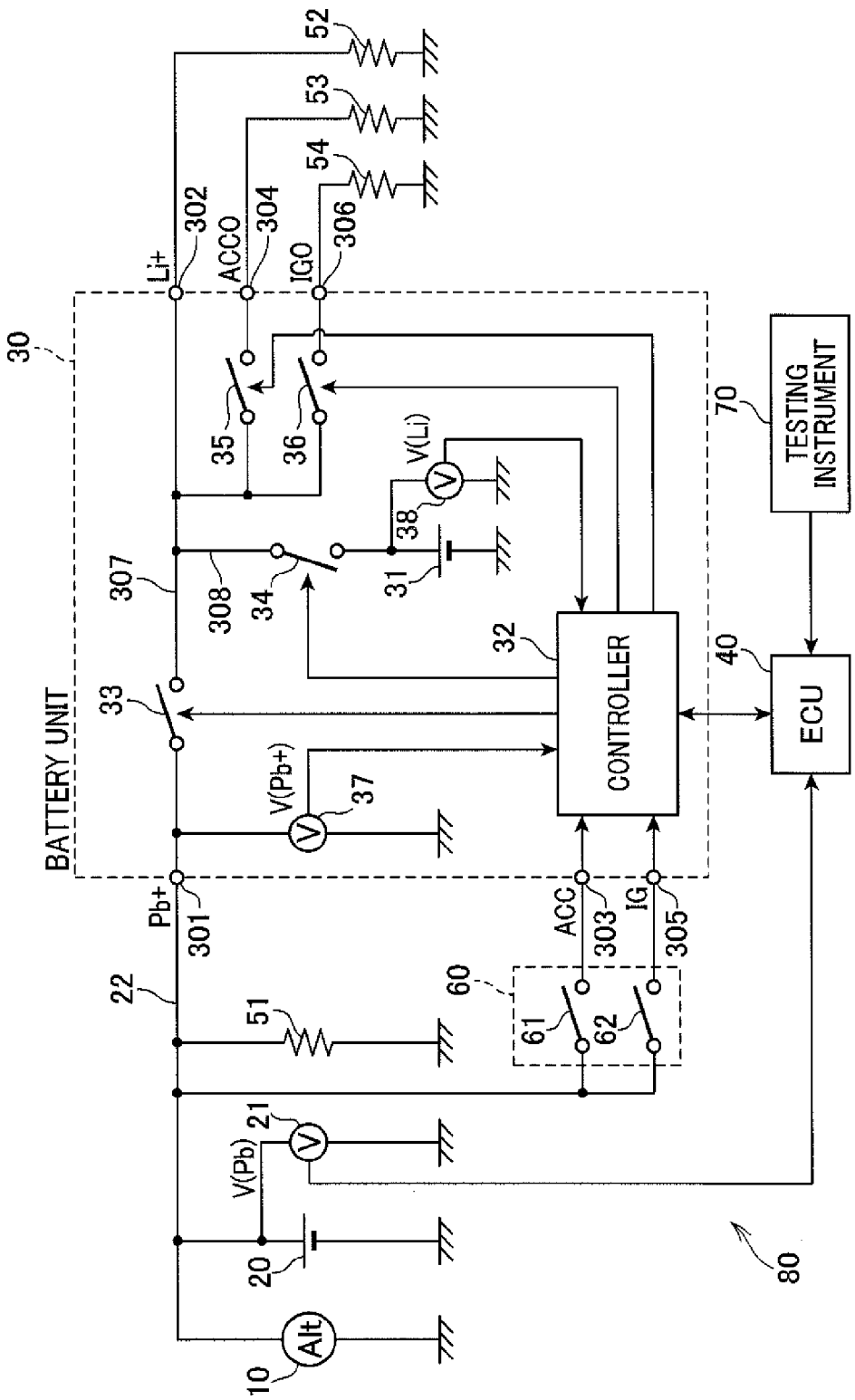
FIG. 1 is a schematic view of a power supply system.

As shown in FIG. 1, in the vehicle, an alternator 10, a lead storage battery 20, a Pb voltage sensor 21, a battery unit 30, an ECU (electronic control unit) 40, a starter 51, various types of electric loads 52 to 54, and a key switch 60 are installed. A power supply system 80 includes the alternator 10, the lead storage battery 20, the Pb voltage sensor 21, the battery unit 30, and the ECU 40. The alternator 10, the lead storage battery 20, and the battery unit 30 are connected to each other via a connecting conductor 22 such as a wiring harness. For example, the alternator 10 and the lead storage battery 20 are disposed inside the engine compartment of the vehicle. The battery unit 30 is disposed in the interior of the vehicle. The connecting conductor 22 is arranged so as to connect between the engine compartment and the interior of the vehicle.

The Pb voltage sensor 21 detects electromotive force of the lead storage battery 20 and provides the detection result to the ECU 40. The voltage detected by the Pb voltage sensor 21 is defined as voltage V (Pb). The battery unit 30 includes a lithium-ion storage battery 31. The lead storage battery 20 and the lithium-ion storage battery 31 are connected to the alternator 10 in parallel. The lithium-ion storage battery 31 has energy efficiency higher than that of the lead storage battery 20. The battery unit 30 includes a controller 32. The controller 32 communicates with the ECU 40, and controls the lithium-ion storage battery 31 and the like included in the battery unit 30.

The ECU 40 is mainly configured with a microcomputer including a CPU, a ROM, and a RAM. The ECU 40 executes various control programs stored in the ROM to control fuel injection, ignition and the like for the internal combustion engine. The ECU 40 performs idling stop control, which automatically stops the internal combustion engine if a predetermined automatic atop condition is met, and thereafter automatically restarts the internal combustion engine by the starter 51 if a predetermined automatic restart condition is met. The ECU 40 controls the internal combustion engine, the alternator 10 and the like on the basis of information obtained from a vehicle speed sensor, a brake sensor, an accelerator sensor and the like, which are not shown, to perform electric power regeneration. Note that an engine ECU, which controls fuel injection, ignition and the like of the internal combustion engine, and an idling stop control ECU, which performs idling stop control, may be separately provided.

The starter 51 is connected to the connecting conductor 22. When starting the internal combustion engine, the starter 51 is supplied with electrical power from the lead storage battery 20. The electric load 52 is, for example, headlights. The electric load 52 is supplied with electrical power having stable voltage from the lithium-ion storage battery 31. The electric load 53 is, for example, accessory devices such as an audio instrument. The electric load 53 is supplied with electrical power when a high-level accessory (ACC) signal described later has been inputted into the battery unit 30. The electric load 54 is, for example, meter devices or devices of an air-conditioning system driven by the internal combustion engine. The electric load 54 is supplied with electrical power when a high-level ignition (IG) signal described later has been inputted into the battery unit 30.

The battery unit 30 includes a control board, a battery pack module (lithium-ion storage battery 31) having a plurality of lithium-ion single batteries, and the like. The battery unit 30 further includes a case portion (housing) accommodating the control board, the battery pack module and the like. The case portion is provided with a Pb positive (+) terminal 301 used for connection with the lead storage battery 20, and a Li positive (+) terminal 302 used for connection with the electric load 52. The Pb positive (+) terminal 301 is connected with the Li positive (+) terminal 302 via an internal unit wiring 307. The internal unit wiring 307 is provided with a first switch 33 formed of, for example, a MOSFET. When the first switch 33 opens, the conduction between the Pb positive (+) terminal 301 and the Li positive (+) terminal 302 is broken. When the first switch 33 closes, the conduction between the Pb positive (+) terminal 301 and the Li positive (+) terminal 302 is established.

The lithium-ion storage battery 31 is connected to a branch line 308 which branches off from the internal unit wiring 307 to the ground (reference potential point) at the side of the Li positive (+) terminal 302 with respect to the first switch 33. The branch line 308 is provided with a second switch 34 formed of, for example, a MOSFET. When the second switch 34 opens, conduction between the lithium-ion storage battery 31 and the internal unit wiring 307 is broken. When the second switch 34 closes, conduction between the lithium-ion storage battery 31 and the internal unit wiring 307 is established. The first switch 33 and the second switch 34 are independently switched from an opened state to a closed state or from a closed state to an opened state depending on a control signal outputted from the controller 32.

The controller 32 obtains information on a state of electric power regeneration by the alternator 10 from the ECU 40. When electric power regeneration is performed by the alternator 10, the controller 32 closes the first switch 33 and the second switch 34. Hence, conduction between the internal unit wiring 307 and the branch line 308 is established, and conduction between the Pb positive (+) terminal 301 and the lithium-ion storage battery 31 is established. As a result, the alternator 10 and the lithium-ion storage battery 31 are connected to each other, whereby the lithium-ion storage battery 31 is charged with electrical power regenerated by the alternator 10.

When electric power regeneration is not performed by the alternator 10, the controller 32 opens the first switch 33 and closes the second switch 34. Due to this control, since the conduction of the internal unit wiring 307 is broken, the connection between the Pb positive (+) terminal 301 and the lithium-ion storage battery 31 is broken. In addition, since the conduction of the branch line 308 is established, the connection between the Li positive (+) terminal 302 and the lithium-ion storage battery 31 is established. As a result, electrical power is supplied to the electric load 52 only from the lithium-ion storage battery 31. When the alternator 10 does not perform electric power regeneration, the lithium-ion storage battery 31 supplies electrical power to the electric load 52. Hence, charging electric power of the lithium-ion storage battery 31 before recharging becomes smaller, which can perform charging efficiently during the recharging.

The battery unit 30 includes a Li voltage sensor 38 which detects electromotive force of the lithium-ion storage battery 31. The detection result of the electromotive force of the lithium-ion storage battery 31 is inputted into the controller 32. The voltage detected by the Li voltage sensor 38 is defined as voltage V(Li). The controller 32 transmits the voltage V(Li) to the ECU 40. A Pb positive (+) voltage sensor 37 is connected to the Pb positive (+) terminal 301. The Pb positive (+) voltage sensor 37 detects a voltage value of electrical power supplied to the battery unit 30 from the alternator 10 or the lead storage battery 20 via the connecting conductor 22. The voltage value detected by the Pb positive (+) voltage sensor 37 is inputted into the controller 32. The voltage detected by the Pb positive (+) voltage sensor 37 is defined as voltage V(Pb+). The controller 32 transmits the voltage V(Pb+) to the ECU 40.

In addition, the battery unit 30 has an ACC terminal 303 and an IG terminal 305, which are input terminals, and an ACCO terminal 304 and an IGO terminal 306, which are output terminals. The ACC terminal 303 and the IG terminal 305 are connected to the key switch 60. The ACCO terminal 304 and the IGO terminal 306 are respectively connected to the electric loads 53 and 54.

The key switch 60 includes an ACC switch 61 and an IG switch 62. The ACC switch 61 and the IG switch 62 are independently opened or closed depending on the operation by the driver. If the switches 61 and 62 are closed, a high-level ACC signal and a high-level IG signal are outputted. When the driver turns a key member in a state where, for example, the key member (IG key) is inserted into a keyhole, the key switch 60 switches between a first state and a second state. In the first state, of the ACC switch 61 and the IG switch 62, only the ACC switch 61 is turned on (closed). In the second state, both the switches 61 and 62 are turned on (closed). At the start of using the vehicle, the operation shifts from the first state to the second state. At the end of using the vehicle, the operation shifts from the second state to the first state. Hence, the IG switch 62 can be turned on and off only in a state where the ACC switch 61 is in an on-state.

Figure 2:
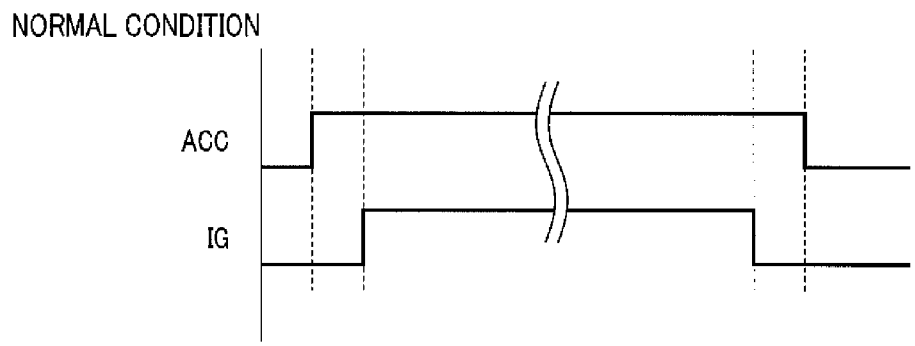
FIG. 2 is a timing diagram of an ignition signal and an accessory signal.

FIG. 2 is a timing diagram showing the change between high level and low level of the ACC signal and the IG signal when the vehicle starts traveling. In FIG. 2, the ACC signal first shifts to the high level. Next, the IG signal shifts to the high level in a state where the ACC signal is the high level. Thereafter, when the vehicle stops traveling, the IG signal first shifts to the low level in a state where the ACC signal is the high level. Next, the ACC signal shifts to the low level.

If the ACC switch 61 is closed by the operation of the driver, the high-level ACC signal is inputted into an ACC terminal 303 of the battery unit 30. When the controller 32 of the battery unit 30 receives the high-level ACC signal via the ACC terminal 303, the controller 32 closes a third switch 35 to supply electrical power to the electric load 53 via the ACCO terminal 304.

If the IG switch 62 is closed by the operation of the driver, the high-level IG signal is inputted into the IG terminal 305 of the battery unit 30. When the controller 32 of the battery unit 30 receives the high-level IG signal, the controller 32 closes a fourth switch 36 to supply electrical power to the electric load 54 via the IGO terminal 306.

Regarding the power supply system 80 configured as described above, possible faults are described.

The connecting conductor 22 connects the alternator 10 and the lead storage battery 20, which are disposed inside the engine compartment of the vehicle, with the battery unit 30 disposed in the interior of the vehicle. It can be considered that a ground fault or a disconnection fault may occur in the connecting conductor 22. For example, if the connecting conductor 22 is damaged due to interference with a device installed in the device or mechanical contact caused by vibration while the vehicle is traveling, a disconnection fault or a ground fault can occur. In addition, if excess current flows through the connecting conductor 22, a fuse provided on the connecting conductor 22 can melt. If mechanical contact or vibration is caused, a connector connecting between the connecting conductor 22 and the positive (+) terminal 301 can become disconnected.

Concerning the ground fault and the disconnection fault of the connecting conductor 22, the ECU 40 determines whether or not the connecting conductor 22 has a fault on the basis of the voltage V (Pb) detected by the Pb voltage sensor 21, the voltage V(Pb+) detected by the Pb positive (+) voltage sensor 37, and the voltage V(Li) detected by the Li voltage sensor 38.

In a state where the first switch 33 and the second switch 34 are closed, if the connecting conductor 22 is in a normal state, the values of the voltage V(Pb), the voltage V(Pb+), and the voltage V(Li) are equal to each other. In contrast, if a disconnection fault occurs in the connecting conductor 22, the values of the voltage V(Pb+) and the voltage V(Li) are equal to each other, but the values of the voltage V(Pb) and the voltage V(Pb+) are different from each other. That is, since the electromotive force of the lead storage battery 20 and that of the lithium-ion storage battery 31 are not equal to each other, the following expression is obtained:

$$V(Pb) \neq V(Pb+)$$

In short, in a state where the first switch 33 and the second switch 34 are closed, if the values of the voltage V(Pb) and the voltage V(Pb+) are different from each other, it can be determined that a disconnection fault has occurred in the connecting conductor 22.

In addition, in a state where the first switch 33 is opened and the second switch 34 is closed, if the connecting conductor 22 is in a normal state, the voltage V(Pb) and the voltage V(Pb+) are equal to each other, and the voltage V(Pb) and the voltage V(Pb+) are different from the voltage V(Li). In contrast, if a ground fault occurs in the connecting conductor 22, the Pb positive (+) terminal 301 is grounded. Hence, the voltage V(Pb+) becomes 0V.

In short, in a state where the first switch 33 is opened, and the second switch 34 is closed, if the voltage V(Pb+) is 0V, it can be determined that a ground fault has occurred in the connecting conductor 22.

Note that, in a state where the first switch 33 is opened, and the second switch 34 is closed, if the connecting conductor 22 is broken (disconnection fault), the Pb positive (+) terminal 301 has high impedance. Hence, the voltage value is not determined. Therefore, when the first switch 33 is opened, and the second switch 34 is closed, whether or not the connecting conductor 22 is broken is not determined (a determination concerning a disconnection fault is not performed).

In addition, as a fault of the power supply system 80 other than the fault occurring in the connecting conductor 22, a fault occurring inside the battery unit 30 can occur. For example, it can be considered that an open fault may occur in either of the first switch 33 and the second switch 34. The open fault is a fault that a switch remains opened even though the controller 32 is outputting a signal for closing the switch. If the open fault occurs in either of the first switch 33 and the second switch 34, in a state where the first switch 33 and the second switch 34 are closed, the voltage values of the voltage V(Pb+) and the voltage V(Li) are different from each other. Hence, it can be determined that an open fault has occurred in either of the first switch 33 and the second switch 34.

Figure 3:
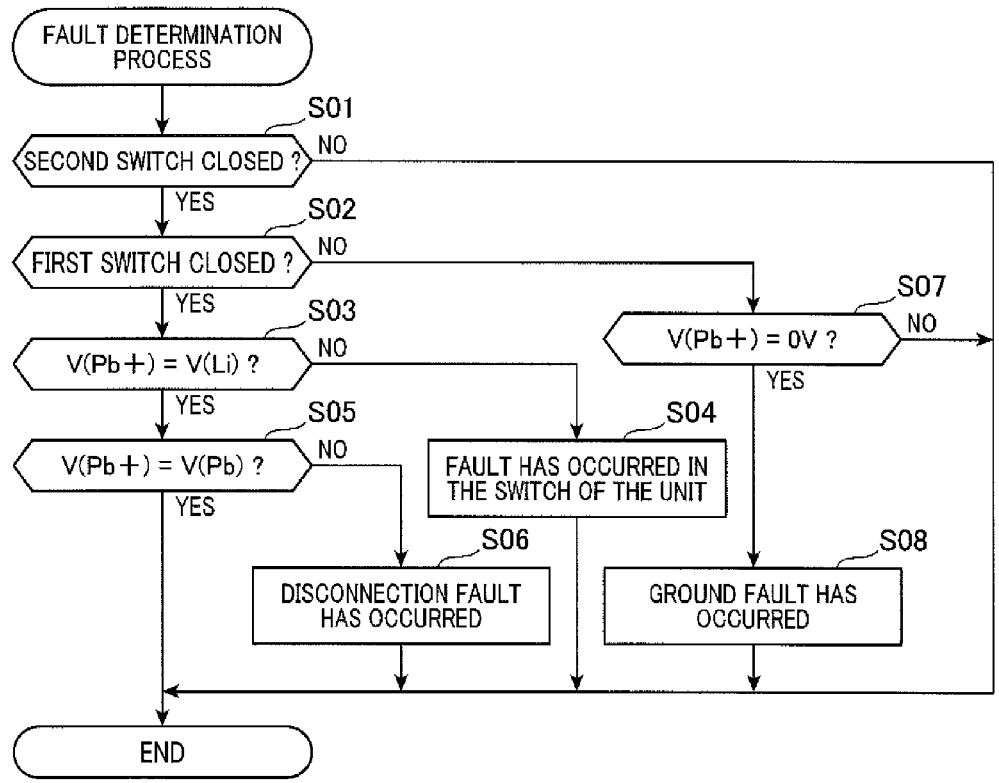
FIG. 3 is a flowchart of a fault determination process for the power supply system.

FIG. 3 is a flowchart of a fault determination process for the power supply system 80 executed by the ECU 40. In step S201, it is detected whether or not the controller 32 has outputted a signal for closing the second switch 34. If a signal for opening the second switch 34 has been outputted (S01: NO), the process is ended. If the signal for closing the second switch 34 has been outputted (S01: YES), in step S02, it is detected whether or not a signal for closing the first switch 33 has been outputted.

If the result is YES in step S02, that is, if a signal for closing the second switch 34 has been outputted and a signal for closing the first switch 33 has been outputted, in step S03, it is determined whether or not the values of the voltage V(Pb+) and the voltage V(Li) are equal to each other. If the values of the voltage V(Pb+) and the voltage V(Li) are different from each other, it is determined that an open fault has occurred in either of the first switch 33 and the second switch 34 (S04). Then, the process is ended.

If it is determined that the values of the voltage V(Pb+) and the voltage V(Li) are equal to each other (S03: YES), in step S05, it is determined whether or not the values of the voltage V(Pb) and the voltage V(Pb+) are equal to each other. If the values of the voltage V(Pb) and the voltage V(Pb+) are equal to each other (S05: YES), the process is ended. If the values of the voltage V(Pb) and the voltage V(Pb+) are different from each other (S05: NO), it is determined that the connecting conductor 22 is broken (a disconnection fault has occurred in the connecting conductor 22) (S06). Then, the process is ended.

If it is NO in step S02, that is, if a signal for closing the second switch 34 has been outputted and a signal for opening the first switch 33 has been outputted, it is determined whether or not the voltage V(Pb+) is 0V (S07). If the voltage V(Pb+) is 0V (S07: YES), it is determined that a ground fault has occurred in the connecting conductor 22 (S08). Then, the process is ended. Alternatively, if the voltage V(Pb+) is not 0V (S07: NO), the process is ended.

If it is determined that a fault has occurred while the vehicle is traveling, the ECU 40 controls an indicator or the like to indicate the fault to the driver so as to prompt the driver to drive for evacuation. Hence, the risk that the vehicle suddenly stops can be avoided.

The power supply system 80 of the present embodiment can also diagnose a fault concerning the key switch 60, which is described below. Hereinafter, a fault of the key switch 60 is diagnosed on the basis of the fact that the ACC signal and the IG signal shift to the high level or the low level in the sequence shown in FIG. 2.

Figure 4:
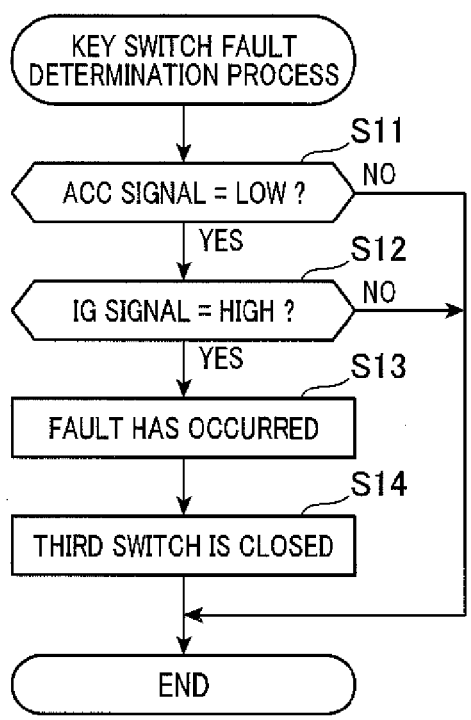
FIG. 4 is a flowchart of a fault determination process for a key switch.

FIG. 4 is a flowchart of a fault determination process for the key switch 60 executed by the ECU 40. In step S11, it is determined whether or not the ACC signal is low level. In step S12, it is determined whether or not the IG signal is high level. In this case, if the ACC signal is in high level or the IG signal is low level (S11: NO or S12: NO), the process is ended.

In addition, if the ACC signal is low level and the IG signal is high level (S11: YES and S12: YES), the process proceeds to step S13. In this case, the ACC signal at low level and the IG signal at high level mean that the ACC switch 61 of the key switch 60 is opened, and the IG switch 62 is closed. The IG switch 62 is closed only when the ACC switch 61 is closed. Hence, it is determined that a fault has occurred in the key switch 60 (S13). In addition, a command for forcibly closing the third switch 35 is outputted to the controller 32 (S14). Hence, even when the key switch 60 has a fault, and the ACC signal remains low level, electrical power is supplied to the electric load 53 via the ACCO terminal 304.

While the vehicle is traveling (while the power supply for the vehicle is turned on), a regeneration state, in which electric power regeneration is performed, and a non-regeneration state, in which electric power regeneration is not performed, repeatedly arises. Depending on the opening and closing states of the switches 33 and 34 in each of the regeneration state and the non-regeneration state, the fault determination is performed. However, in the present embodiment, the fault determination can be performed other than while the vehicle is traveling, which is described below.

The ECU 40 can be connected with a testing instrument 70 (external device) such as a diagnosis tester. When a test is performed by a car dealership or the like, the testing instrument 70 is connected to the ECU 40 (refer to FIG. 1). In this case, when the ECU 40 receives a fault diagnosis request from the testing instrument 70, the ECU 40 performs the fault determination for the power supply system 80.

Figure 5:
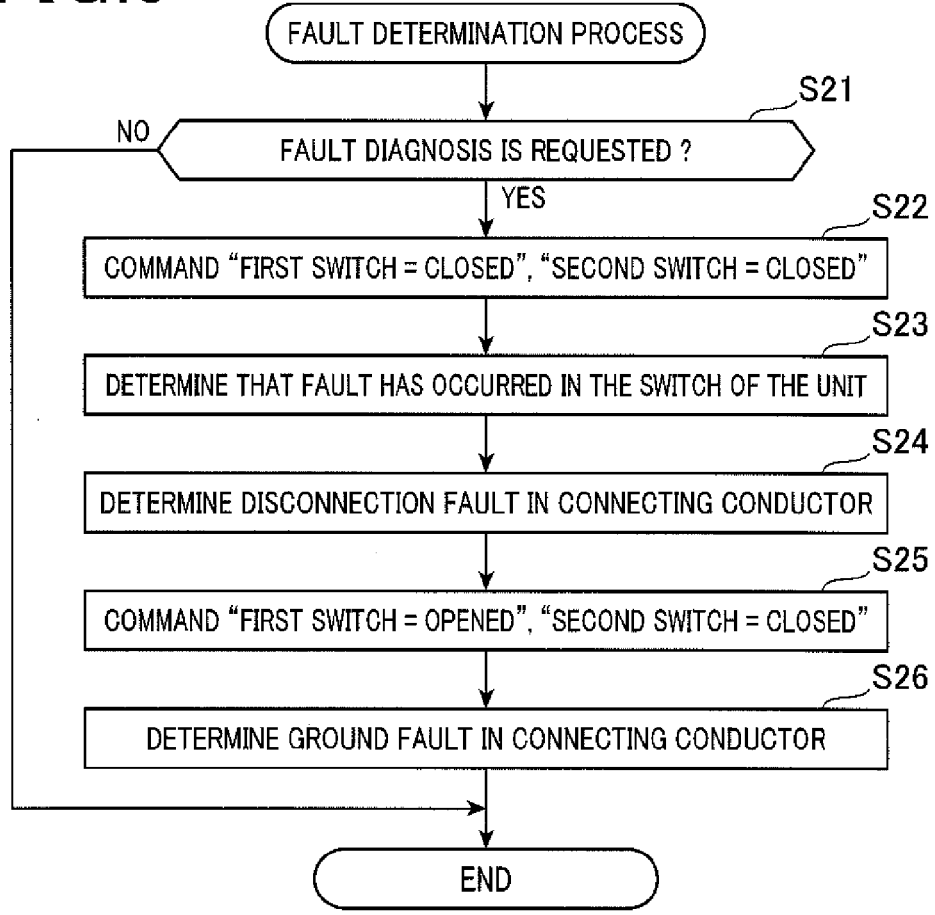
FIG. 5 is a flowchart of a fault determination process for the power supply system performed in response to a fault diagnosis request.

Specifically, regarding the fault determination, the ECU 40 executes the process shown in FIG. 5. In FIG. 5, in step S21, it is determined whether or not a fault diagnosis request is received from the testing instrument 70. If a fault diagnosis request is received, the process proceeds to the following step S22. If a fault diagnosis request is not received, the process is ended.

In step S22, a control command is outputted to the controller 32 to close both the first switch 33 and the second switch 34. Receiving this control command, the controller 32 closes both the first switch 33 and the second switch 34. In this state, it is determined whether or not the switches in the battery unit 30 have a fault (S23), and whether or not a disconnection fault has occurred in the connecting conductor 22 (S24). Note that steps S23 and S24 correspond to steps S03 to S06 in FIG. 3.

After steps S23 and S24, in step S25, a control command is outputted to the controller 32 to open the first switch 33 and close the second switch 34. Receiving this control command, the controller 32 opens the first switch 33 and closes the second switch 34. In this state, it is determined whether or not a ground fault of the connecting conductor 22 has occurred (S26). Note that step S26 is associated with steps S07 and S08 in FIG. 3.

Hereinafter, advantages of the present embodiment are described.

In the present embodiment, a fault is determined on the basis of the opening and closing states of the first switch 33 and the second switch 34 in the battery unit 30. In addition, the voltage V(Pb+), which is the voltage at the Pb positive (+) terminal 301 of the battery unit 30, and the voltage V(Pb), which is the electromotive force of the lead storage battery 20, are detected. The detection results are used for determining a fault. The voltage V(Pb+), in addition to the voltage V(Pb), depends on the opening and closing states of the first switch 33 and the second switch 34 of the battery unit 30. Hence, by determining a fault on the basis of the opening and closing states of the first switch 33 and the second switch 34, whether the detection values of the voltage V(Pb+) and the voltage V(Pb) are normal values or abnormal values can properly be determined, which can determine whether or not a fault has occurred in the connecting conductor 22.

Hence, when any fault has occurred in the power supply system 80, it can be determined whether or not the fault has occurred in the connecting conductor 22. Hence, problems that the battery unit 30 is unnecessarily changed or subjected to maintenance can be prevented.

In addition, in a state where electric power regeneration is being performed, both the first switch 33 and the second switch 34 are closed. In this state, comparing the voltage V(Pb+) with the voltage V(Pb) can properly determine that a disconnection fault has occurred. Comparing the voltage V(Pb+) with the voltage V(Li) can properly determine that open faults of the first switch 33 and the second switch 34 have occurred.

In addition, in a state where electric power regeneration is not being performed, the first switch 33 is opened, and the second switch 34 is closed. In this state, comparing the voltage V(Pb+) with the ground potential (0V) can properly determine that a ground fault has occurred in the connecting conductor 22.

In addition, when a test is performed by a car dealership or the like, the testing instrument 70 such as a diagnosis tester, which is an external device, is connected to the ECU

40 and is operated. Thereby, the opening and closing states of the first switch 33 and the second switch 34 can be changed. Hence, a disconnection fault and a ground fault of the connecting conductor 22 and open faults of the first switch 33 and the second switch 34 can be detected.

In addition, the battery unit 30 has a fault determination function for the key switch 60. Hence, even when an open fault has occurred in the ACC switch 61, power can be properly supplied from the lithium-ion storage battery 31 to the electric loads 53, 54, which can realize a fail operation when a fault occurs.

Note that the above embodiment can be modified as follows.

A fault may be determined by the controller 32 of the battery unit 30. Specifically, the controller 32 performs the processes shown in FIGS. 3 to 5. In this case, the battery unit 30 has a fault determination function for the connecting conductor 22, a fault determination function for the first switch 33 and the second switch 34, and a fault determination function for the key switch 60. Note that a voltage value of the voltage V(Pb) is required to be received from the ECU 40.

In the above embodiment, while the power supply for the vehicle is turned on, and when the first switch 33 and the second switch 34 are closed in an electric power regeneration state, it is determined whether or not the switches in the battery unit 30 have a fault and whether or not the connecting conductor 22 has a disconnection fault. In addition, when the first switch 33 is opened and the second switch 34 is closed in an electric power non-regeneration state, it is determined whether or not a ground fault of the connecting conductor 22 has occurred. However, the first switch 33 may be temporarily opened and the second switch 34 may be temporarily closed in an electric power regeneration state to determine whether or not a ground fault of the connecting conductor 22 has occurred. The first switch 33 and the second switch 34 may be temporarily closed in an electric power non-regeneration state to determine whether or not the switches in the battery unit 30 have a fault and whether or not the connecting conductor 22 has a disconnection fault.

In addition, when the vehicle starts or power supply is stopped, the fault determination processes may be performed. For example, when the IG switch 62 is turned off, the first switch 33 and the second switch 34 are closed, or the first switch 33 is opened and the second switch 34 is closed.

The key switch 60 may be limited so that the IG switch 62 can be controlled from an opened state to a closed state on the condition that the ACC switch 61 is in a closed state. For example, the key switch 60 may be electronically controlled and operated by a so-called remote control engine starter or the like. The switches such as the first switch 33 may be a relay switch or a semiconductor switch, which is configured with a MOSFET.

The first storage battery and the second storage battery may be other than the combination of a lead storage battery and a lithium-ion storage battery. Lithium-ion storage batteries may be used as the first storage battery and the second storage battery. In this case, two battery units each of which has the lithium-ion storage battery are connected via a connecting conductor. In the fault determination process, a fault of the connecting conductor is determined. Note that, from the viewpoint of manufacturing costs, it is desirable that a lead storage battery is used as the first storage battery.

As the second storage battery included in the battery unit, a secondary battery such as a nickel-cadmium storage battery (Ni—Cd battery) or a nickel-metal hydride storage battery (Ni—MH battery) can be used instead of the lithium-ion storage battery.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a power supply system (80) is provided which includes a first storage battery (20), a battery unit (30) which includes a second storage battery (31), and a generator (10) which charges the first storage battery and the second storage battery. The battery unit is connected to the generator and the first storage battery via a connecting conductor (22).

In addition, the battery unit includes a connection terminal (301) to which the connecting conductor is connected, an output terminal (302) which is connected to an electric load (52) and supplies electrical power to the electric load from any of the generator, the first storage battery, and the second storage battery, a first switch (33) which is disposed on a wiring (307) connecting between to the connection terminal and the output terminal, and opens and closes between the connection terminal and the output terminal, a branch line (308) which branches off from the wiring between the first switch and the output terminal, and to which the second storage battery is connected, a second switch (34) which is disposed on the branch line between the wiring and the second storage battery, and opens and closes between the wiring and the second storage battery, a first voltage detecting unit (37) which detects voltage of the connection terminal, and a switch control unit (32) which controls opening and closing of the first switch and the second switch.

The power supply system further includes a second voltage detecting unit (21) which detects electromotive force of the first storage battery, and a fault determining unit (32, 40) which determines a fault of the connecting conductor on the basis of opening and closing states of the first switch and the second switch controlled by the switch control unit and detection results of the first voltage detecting unit and the second voltage detecting unit.

In the configuration in which a battery unit is connected to a generator and a first storage battery via a connecting conductor, it is concerned that a fault such as a disconnection fault and a ground fault may occur in the connecting conductor. In this regard, in the above power supply system, a fault is determined on the basis of the opening and closing states of the first switch and the second switch in the battery unit. In addition, the voltage at the connection terminal of the battery unit and the electromotive force of the first storage battery are detected. The detection results are used for determining a fault. The voltage of the connection terminal, in addition to the electromotive force of the first storage battery, depends on the opening and closing states of the first switch and the second switch of the battery unit. Hence, by determining a fault on the basis of the opening and closing states of the first switch and the second switch, whether the detection values of the voltage of the connection terminal and the electromotive force of the first storage battery are normal values or abnormal values can properly be determined, which can determine whether or not a fault has occurred in the connecting conductor.

What is claimed is:
1. A power supply system, comprising:
   a first storage battery;

a battery unit which includes a second storage battery;
a generator which charges the first storage battery and the second storage battery, wherein
the battery unit is connected to the generator and the first storage battery via a connecting conductor,
the battery unit comprising:
a connection terminal to which the connecting conductor is connected;
an output terminal which is connected to a first electric load and supplies electrical power to the first electric load from at least one of the generator, the first storage battery, and the second storage battery;
a first switch which is disposed on an in-unit wiring connecting the connection terminal and the output terminal, and opens and closes between the connection terminal and the output terminal;
a branch line which branches off from the in-unit wiring between the first switch and the output terminal, the branch line connected to the second storage battery;
a second switch which is disposed on the branch line between the in-unit wiring and the second storage battery, and opens and closes between the in-unit wiring and the second storage battery;
a third switch connected between the in-unit wiring and a second electric load via an accessory power terminal;
a first voltage detecting unit which detects voltage of the connection terminal; and
a switch control unit which controls opening and closing of the first switch and the second switch;
a second voltage detecting unit which detects electromotive force of the first storage battery;
a fault determining unit which determines a fault of the connecting conductor on the basis of opened and closed states of the first and second switches controlled by the switch control unit and detection results of the first voltage detecting unit and the second voltage detecting unit, wherein
the fault determining unit determines that a disconnection fault has occurred in the connecting conductor, when the switch control unit controls both the first switch and the second switch so as to be in closed states and if the voltage of the connection terminal detected by the first voltage detecting unit differs from the electromotive force of the first storage battery detected by the second voltage detecting unit, and
the fault determining unit determines that a ground fault has occurred in the connecting conductor, when the switch control unit controls the first switch so as to be in an opened state and the second switch so as to be in a closed state and if the voltage of the connection terminal detected by the first voltage detecting unit is a ground potential; and
an electronic control unit (ECU) that receives a fault diagnosis request from a testing equipment, and in response, commands the switch control unit to open and close the first switch and the second switch in order that the fault determining unit is able to determine if the disconnection fault or the ground fault has occurred in the connecting conductor, and outputs to the switch control unit a command for forcibly closing the third switch, wherein
the power supply system further comprises a key switch operable by a user for controlling operation of a vehicle power supply and a power supply for an in-vehicle accessory device of a vehicle, the vehicle connected to the battery unit, wherein the key switch has a main switch for turning on and off the vehicle power supply and a sub-switch for turning on and off the power supply for the in-vehicle accessory device, the main switch being capable of being turned on and off only when the sub-switch is turned on, and the main switch and the sub-switch being applied to the vehicle connected to the battery unit,
the battery unit has an electrical power supply control unit which controls supplying electrical power from the second storage battery to electric loads on the basis of input signals received from the main switch and the sub-switch; and
a second fault determining unit which determines a fault of the key switch on the basis of the input signals received from the main switch and the sub-switch, wherein
if the second fault determining unit determines that the fault of the key switch has occurred, the electronic control unit outputs to the switch control unit a command for forcibly closing the third switch.

2. The power supply system according to claim 1, wherein
the first voltage detecting unit detects the voltage between the connection terminal and the first switch as the voltage of the connection terminal,
the battery unit includes a third voltage detecting unit which detects the voltage between the second switch and the second storage battery as the electromotive force of the second storage battery, and
the fault determining unit determines that a fault has occurred in either of the first switch and the second switch in the battery unit, when the switch control unit controls both the first switch and the second switch so as to be in closed states and if the voltage of the connection terminal detected by the first voltage detecting unit differs from the electromotive force of the second storage battery detected by the third voltage detecting unit.

3. The power supply system according to claim 1, wherein
the generator performs electric power regeneration when a vehicle is decelerating,
the first storage battery and the second storage battery are charged with regenerated electric power of the generator, and
the switch control unit controls the first switch and the second switch so as to be in closed states when the generator is in an electric power regeneration state, and controls the first switch so as to be in an opened state and the second switch so as to be in a closed state when the generator is not in an electric power regeneration state.

4. The power supply system according to claim 1, further comprising a receiving unit which receives a fault diagnosis request from an external device, wherein
the switch control unit controls opening and closing of the first switch and the second switch in response to the fault diagnosis request when the receiving unit receives the fault diagnosis request.

5. The power supply system according to claim 1, wherein the second fault determining unit determines the fault of the key switch if the input signal received from the sub-switch is low level and if the input signal received from the main switch is high level.

6. A power supply system, comprising:
a first storage battery;
a battery unit which includes a second storage battery;
a generator which charges the first storage battery and the second storage battery, wherein the battery unit is connected to the generator and the first storage battery via a connecting conductor, the battery unit comprising:
   a connection terminal to which the connecting conductor is connected;
   an output terminal which is connected to a first electric load and supplies electrical power to the first electric load from at least one of the generator, the first storage battery, and the second storage battery;
   a first switch which is disposed on an in-unit wiring connecting the connection terminal and the output terminal, and opens and closes between the connection terminal and the output terminal;
   a branch line which branches off from the in-unit wiring between the first switch and the output terminal, the branch line connected to the second storage battery is connected;
   a second switch which is disposed on the branch line between the in-unit wiring and the second storage battery, and opens and closes between the in-unit wiring and the second storage battery;
   a third switch connected between the in-unit wiring and a second electric load via an accessory power terminal;
   a first voltage detecting unit which detects voltage of the connection terminal; and
   a switch control unit which controls opening and closing of the first switch and the second switch;
   a second voltage detecting unit which detects electromotive force of the first storage battery;
a fault determining unit which determines a fault of the connecting conductor on the basis of opened and closed states of the first and second switches controlled by the switch control unit and detection results of the first voltage detecting unit and the second voltage detecting unit, wherein the fault determining unit determines that a disconnection fault has occurred in the connecting conductor, when the switch control unit controls both the first switch and the second switch so as to be in closed states and if the voltage of the connection terminal detected by the first voltage detecting unit differs from the electromotive force of the first storage battery detected by the second voltage detecting unit, and the fault determining unit determines that a ground fault has occurred in the connecting conductor, when the switch control unit controls the first switch so as to be in an opened state and the second switch so as to be in a closed state and if the voltage of the connection terminal detected by the first voltage detecting unit is a ground potential; and an electronic control unit (ECU) that determines whether the fault is a fault in the connecting conductor based on fault information from the fault determining unit indicating the determined disconnection fault or ground fault or whether the fault is in a key switch based on a shift in a high-level accessory (ACC) signal and a high-level ignition (IG) signal, the ECU (i) allowing electrical power to be supplied to the first electric load if the fault is determined to be in the key switch or (ii) controlling an indicator to indicate the fault information to cease operation of the power supply system if the fault is determined to be a fault in the connecting conductor, and the ECU outputs to the switch control unit a command for forcibly closing the third switch, wherein the power supply system further comprises a key switch operable by a user for controlling operation of a vehicle power supply and a power supply for an in-vehicle accessory device of a vehicle, the vehicle connected to the battery unit, wherein the key switch has a main switch for turning on and off the vehicle power supply and a sub-switch for turning on and off the power supply for the in-vehicle accessory device, the main switch being capable of being turned on and off only when the sub-switch is turned on, and the main switch and the sub-switch being applied to the vehicle connected to the battery unit, the battery unit has an electrical power supply control unit which controls supplying electrical power from the second storage battery to electric loads on the basis of input signals received from the main switch and the sub-switch; and a second fault determining unit which determines a fault of the key switch on the basis of the input signals received from the main switch and the sub-switch, wherein if the second fault determining unit determines that the fault of the key switch has occurred, the electronic control unit outputs to the switch control unit a command for forcibly closing the third switch.

7. The power supply system according to claim 6, wherein the first voltage detecting unit detects the voltage between the connection terminal and the first switch as the voltage of the connection terminal, the battery unit includes a third voltage detecting unit which detects the voltage between the second switch and the second storage battery as the electromotive force of the second storage battery, and the fault determining unit determines that a fault has occurred in either of the first switch and the second switch in the battery unit, when the switch control unit controls both the first switch and the second switch so as to be in closed states and if the voltage of the connection terminal detected by the first voltage detecting unit differs from the electromotive force of the second storage battery detected by the third voltage detecting unit.

8. The power supply system according to claim 6, wherein the generator performs electric power regeneration when a vehicle is decelerating, the first storage battery and the second storage battery are charged with regenerated electric power of the generator, and the switch control unit controls the first switch and the second switch so as to be in closed states when the generator is in an electric power regeneration state, and controls the first switch so as to be in an opened state and the second switch so as to be in a closed state when the generator is not in an electric power regeneration state.

9. The power supply system according to claim 6, further comprising a receiving unit which receives a fault diagnosis request from an external device, wherein
   the switch control unit controls opening and closing of the first switch and the second switch in response to the fault diagnosis request when the receiving unit receives the fault diagnosis request.

10. The power supply system according to claim 6, wherein the second fault determining unit determines the fault of the key switch if the input signal received from the sub-switch is low level and if the input signal received from the main switch is high level.

* * * * *